May 21, 1940.  J. W. MORGAN  2,201,912
SHOCK ABSORBING AND LOAD EQUALIZING OR STABILIZING MEANS
Filed Oct. 11, 1937  3 Sheets—Sheet 1
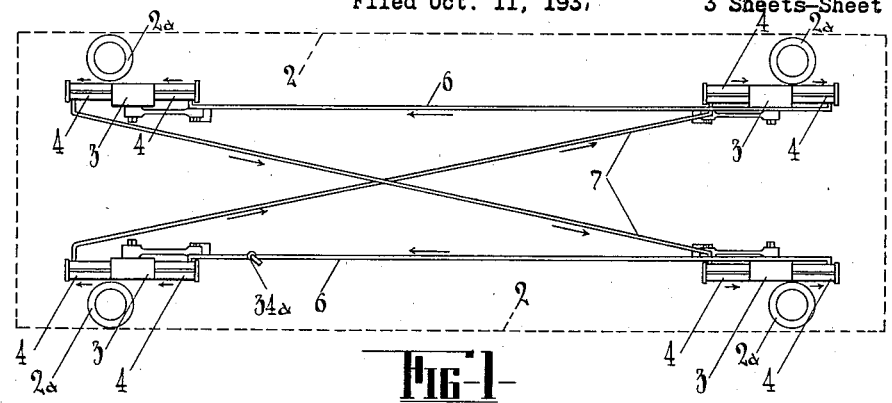
FIG-1-
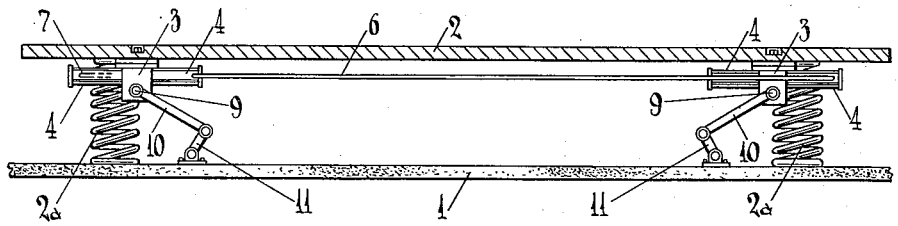
FIG-2-
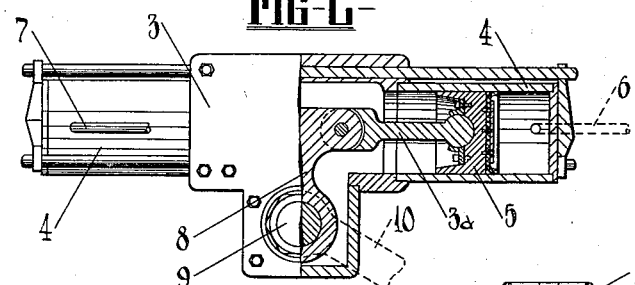
FIG-3-
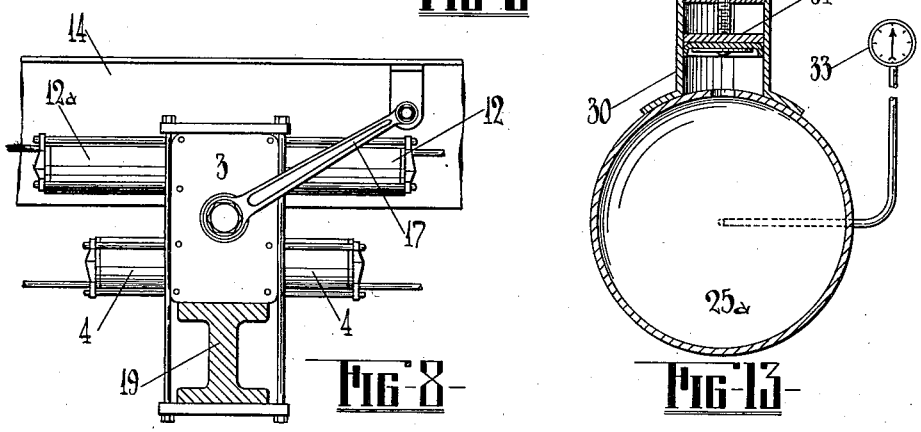
FIG-8-
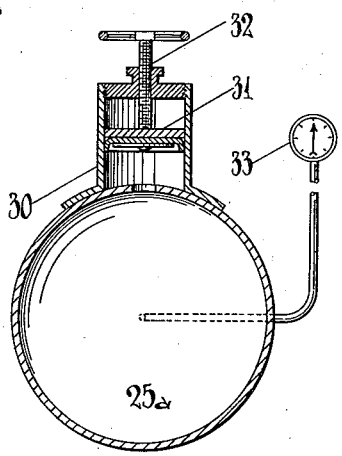
FIG-13-
J. W. Morgan, Inventor,
By Glascock Downing & Seebold
Attys.

May 21, 1940.   J. W. MORGAN   2,201,912
SHOCK ABSORBING AND LOAD EQUALIZING OR STABILIZING MEANS
Filed Oct. 11, 1937   3 Sheets-Sheet 2
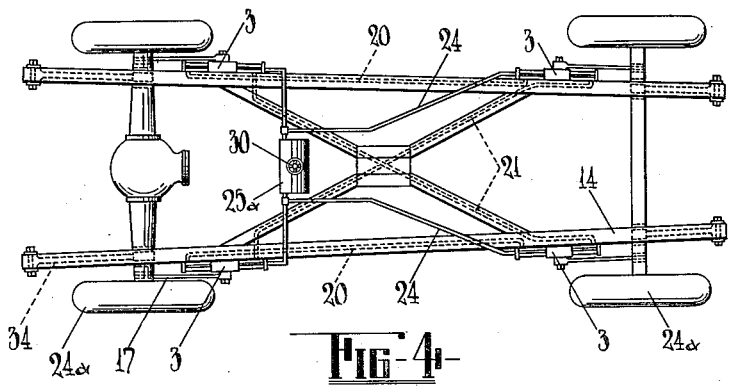
FIG-4-
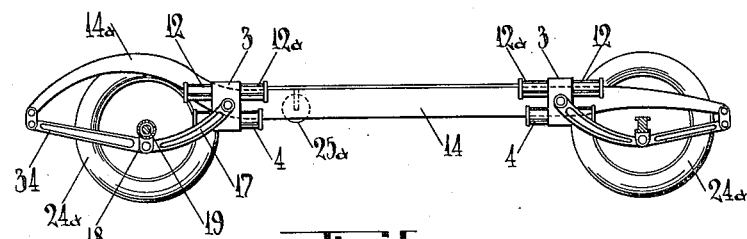
FIG-5-
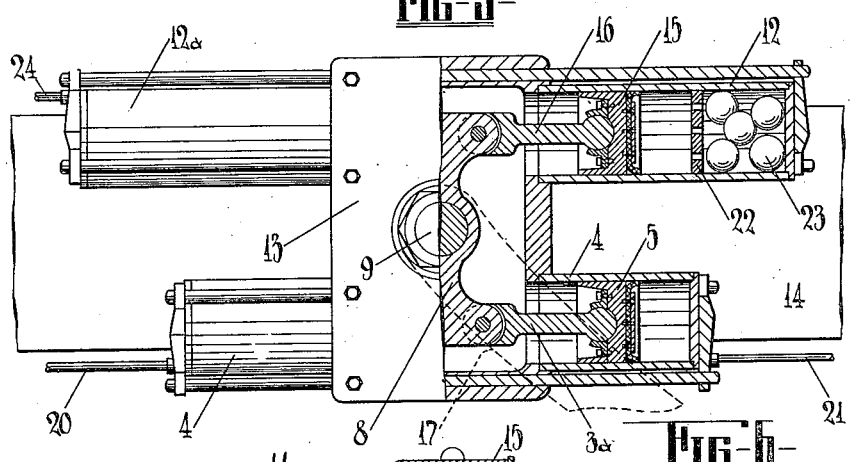
FIG-6-
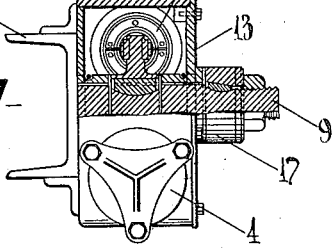
FIG-7-
Inventor,
J. W. Morgan
By: Glascock Downing & Seebold
Attys.

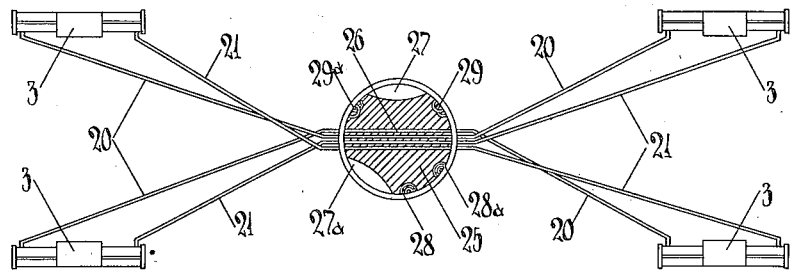
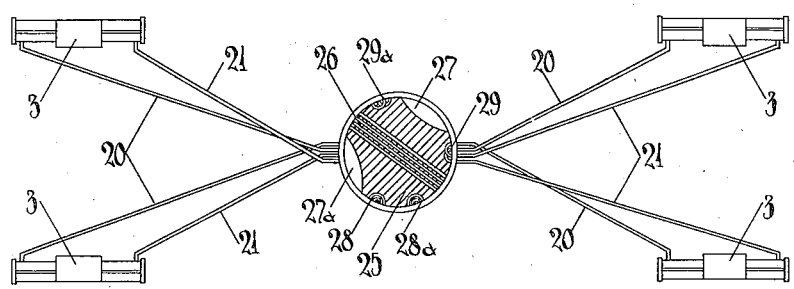
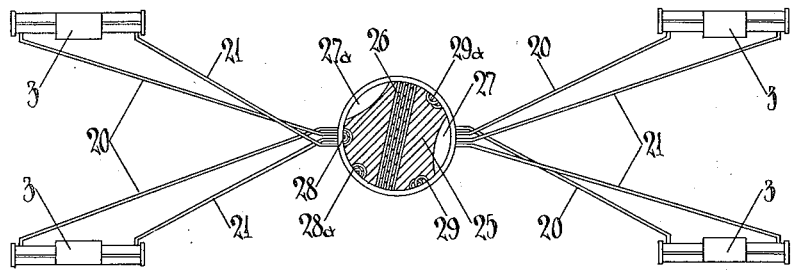
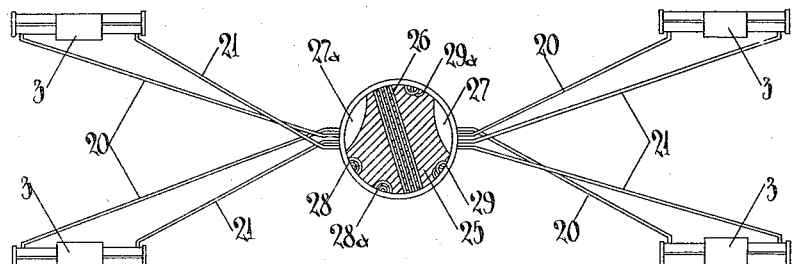

Patented May 21, 1940

2,201,912

UNITED STATES PATENT OFFICE 2,201,912

SHOCK ABSORBING AND LOAD EQUALIZING OR STABILIZING MEANS

John William Morgan, Auckland, New Zealand, assignor of one-half to Horace Paykel, Auckland, New Zealand Application October 11, 1937, Serial No. 168,498
In New Zealand October 17, 1936

3 Claims. (Cl. 280—124)

The invention relates to means for absorbing or neutralizing shocks and vibration, between a supporting or resisting base, and apparatus supported by or acting against said base, said invention also being concerned with the equalizing or distribution and indication of the load borne by said base.

It is known in connection with spring mountings to employ cylinders containing pistons or plungers and a liquid acting in conjunction with resilient means, such as springs or elastic chambers containing air or other gas, and it is also known in connection with load equalizing devices to employ between the supported and supporting parts, closed cylinders, containing pistons and a hydraulic medium adapted to be transferred as the result of displacement between the affected parts, to a further cylinder or cylinders for the purpose of correcting or neutralizing the displacement.

The object of the present invention is to provide improved means for the purposes aforesaid, and although particularly adapted for use between the bodies and wheeled undercarriages or portions of vehicles, said invention is not restricted in its application to wheeled vehicles, but can be used wherever shock or vibration requires to be absorbed or neutralized or/and a load requires to be distributed or stabilized.

Briefly, the invention comprises cylinders and pistons fitted between a base and apparatus supported therefrom, so that movement between said base and said apparatus is responsible for movement between said pistons and said cylinders, characterized by the latter being included in a circuit containing a hydraulic medium, whereby movement of one or more pistons is transmitted to the remaining piston or pistons, to maintain the supported apparatus in desired relationship with said base.

The invention further consists in providing opposed cylinders containing a hydraulic medium, pistons and resilient cushions, to serve as spring mountings between the base and said apparatus, the arrangement with the aforesaid means being such that the latter relieve the spring mountings of all strain or work, except that which they are called upon to perform in resiliently supporting said load.

As applied to a wheeled vehicle, the invention resides in mounting a body on an undercarriage, by providing at suitable points between the latter and said body, mounting units each comprising pairs of opposed pistons operable in closed cylinders, said pistons being connected to rocker arms on a shaft adapted to be given turning movement to reciprocate the pistons, through its connection with a lever arm or arms either by reason of the cylinders being given vertical movement, and one end of the lever arm or arms being anchored, or by reason of the cylinders being anchored, and one end of the lever arm or arms being given vertical movement.

Of the opposed cylinders one pair thereof of each unit contains a hydraulic medium such as oil, said cylinders of the various units being interconnected to provide for the transfer of the hydraulic medium from unit to unit, so that said cylinders will serve or act as stabilizers and shock absorbers as required, while the other opposed cylinders of the units also contain a hydraulic medium, and resilient cushions in the form of balls or pads, and serve or act as the spring mountings for the vehicle body.

The invention will be fully described in conjunction with the accompanying drawings in which—

Figures 1 and 2 are views mainly diagrammatic illustrating the general principle and layout of the invention, Figure 3 is a part elevation and part sectional elevation of one of the opposed cylinder units comprised in the invention as used in Figures 1 and 2, Figures 4 and 5 show by means of a plan view and an elevation respectively, the application of the invention to a wheeled vehicle, Figure 6 is a part elevation and a part sectional elevation, and Figure 7 a part end elevation and part cross sectional elevation of one of the opposed cylinder units comprised in the invention as used in Figures 4 and 5, Figure 8 is an elevation illustrating an alternative mounting for the opposed cylinder units, and Figures 9, 10, 11 and 12 illustrate diagrammatically means for providing for the control of opposed cylinder units as required, Figure 13 illustrates means for enabling the resistance in hydraulically charged load supporting cylinders to be adjusted to suit varying loads.

As illustrated in Figures 1 and 2, there is provided a stationary base 1, between which and a rise and fall platform 2, supported therefrom, mounting units 3, are provided at suitable points, said mounting units 3, each comprising a pair of opposed cylinders 4 (Figure 3), containing a hydraulic medium and opposed pistons 5, said cylinders 4 being interconnected with each other by pipes 6, which connect with each other the same ends of corresponding cylinders 4 at the same side of the apparatus, while pipes 7 connect with each other, the same ends of cylinders 4 of diagonally opposite units 3, and which last-mentioned cylinders 4 are not interconnected by the pipes 6.

The platform 2 is resiliently supported, any suitable form of spring mounting being employed, and for the purpose of illustration only, coiled springs 2a are shown supporting the platform 2.

The opposed pistons 5 of each unit 3 are connected by rods 3a, to a rocker arm 8 keyed on a shaft 9 on which is also keyed one end of a lever arm 10, the other end of which is connected by a link 11 with the base 1, so that downward movement of the platform 2 results in turning movement being imparted to the shaft 9 and the pistons 5 being caused to travel outwards in the unit 3.

The arrangement just described and illustrated in Figures 1, 2 and 3, provides by means of the cylinders 4 and the pipes 6, and 7, a hydraulic circuit in which the pistons 5 are placed at selected points, the hydraulic medium employed, serving as means for transmitting motion between the units 3.

If therefore, the platform 2 be depressed over one unit 3, the pistons 5 therein are actuated to cause the hydraulic medium to move through the circuit in the direction indicated by the arrows (Figure 1), with the result that the pistons 5 in the other units 3, are all given movement in sympathy with the pistons 5 of the unit 3 first affected, whereby all the shafts 9 have imparted thereto at the same time, the same degree of turning movement, and the platform 2 moves downwards or tends to move downwards while remaining level, or without tilting.

In effect the units 3, with the pistons 5 therein and associated parts, provide means for coupling or connecting the platform 2 to the hydraulic medium at selected points, so that vertical movement at any point between the platform 2 and the base 1, is not confined to that particular point, but is distributed evenly over the circuit or system and stabilizes or maintains the platform 2 always in correct relationship to the base 1.

In Figures 4 to 7, wherein the invention is shown as applied to the mounting of the body of a wheeled vehicle on the chassis thereof, and which also includes an improved spring mounting for said body, each unit 3 comprises a pair of upper opposed cylinders 12, 12a, which are the spring mounting cylinders, and a pair of lower opposed cylinders 4, said cylinders 12, 12a and 4, extending from a housing 13 adapted for attaching to a vehicle frame or chassis 14.

The shaft 9 has keyed thereon, in this case a double ended rocker arm 8, pistons 15 in the upper opposed cylinders 12, 12a being connected by rods 16 with the upper ends of said arms 8, while the pistons 5 in the lower opposed cylinders 4 are connected by the rods 3a with the lower ends of the rocker arms 8.

The shaft 9 in the housing 13, also has mounted thereon so as to turn therewith, one end of a lever arm 17, the other end of which is anchored to the vehicle axle 19 or the housing for the latter as for instance by a link 18.

The units 3 are disposed at various points on the chassis 14, the lower opposed cylinders 4 which contain a hydraulic medium such as oil, being interconnected, cylinders 4 at the same ends of units 3 at the same side of the vehicle, being in communication with each other, through the same ends and the pipe lines 20, while the remaining cylinders 4 at the same ends of diagonally opposite units 3 are also in communication with each other, through the same ends and the pipe lines 21.

The upper opposed cylinders 12, 12a of the units 3 contain in addition to the pistons 15, a hydraulic medium such as oil, perforated plates 22 and resilient cushions 23 and provide the spring mounting and snubbers for the vehicle body, the perforated plates serving merely to protect the cushions 23 from the pistons 15.

Of the opposed cylinders 12, 12a, cylinders 12a are the load carrying cylinders and serve as, or form part of the spring mounting, while cylinders 12 serve to check rebound or act as snubbers. Instead of providing each load carrying cylinder 12a with separate perforated plates 22 and resilient cushions 23, said cylinders 12a may all be placed in communication through pipe lines 24 with a common closed chamber or cylinder 25a containing one or more resilient cushions 23 of suitable area and size, said common chamber or cylinder 25a being located in a position convenient to serve the individual piston cylinders 12a. Cylinders 12 however, still having therein the cushions 23 and hydraulic medium so as to act as snubbers and check rebound as before.

Also, although the spring mounting cylinders 12, 12a and the stabilizer cylinders 4 have been referred to as upper and lower opposed cylinders respectively, it will be obvious from the earlier description that the positions of said cylinders 12, 12a and 4 need not necessarily be confined to the positions indicated, as the positions may be reversed, or said pairs of opposed cylinders 12, 12a and 4 may be placed side by side as found most suitable.

The chassis 14 may be formed and made to extend over the axle 19 of the vehicle as at 14a, and be supported above said axles 19 per medium of the units 3 comprising the opposed cylinders 12, 12a and 4, with their pistons 15 and 5, piston rods 16 and 3a, shafts 9, rocker arms 8 and the lever arms 17.

If desired, the ends 14a of the chassis 14 can be connected by means of links and rods 34 with the axles 19, or said axle housings.

Also instead of the units 3 with the opposed cylinders 12, 12a and 4 thereon being attached to the chassis 14, and the lever arms 17 anchored to the axles 19 or axle housings, said units 3 can be mounted on the axles 19 or the axle housings, and the lever arms 17 anchored to the chassis 14 (Figure 8).

The arrangement described in conjunction with Figures 4 to 7, is such that the hydraulic circuit in which the units 3 are placed, is the same as that before described, except that the fluid travels in the reverse direction, and upon one or more of the wheels 24a of the vehicle coming in contact with an uneven surface over which the vehicle is travelling, or by the action of the load being carried, the pistons 5, are, as the result of vertical movement anywhere between the chassis 14 and an axle, or the axles 19, given movement in their cylinders 4, to equalize or distribute the movement evenly through the circuit and over the chassis 14 whereby the latter is prevented from tilting or swaying, or is confined to up and down movement.

The pistons 15 in the cylinders 12, are moved in the latter at the same time as, but in the reverse direction to, the pistons 5, said pistons 15, in conjunction with the hydraulic medium, the perforated plates 22 and resilient cushions 23, in said cylinders 12, acting as a spring or cushion mounting for the chassis 14, and owing to the absence of swaying or tilting of the body and chassis 14, which is corrected or neutralized by the hydraulic circuit and the pistons 5 as before described, the spring or cushion mounting cylinders 12 are left to perform only their normal function of providing a resilient mounting or support for the chassis 14.

Each unit 3 of opposed cylinders 12, 12a and 4, and associated parts, performs the functions of a spring mounting for the chassis, a rebound spring or snubber and a load stabilizer.

By means of a suitable valve placed in the pipe lines 20, 21, the actions of the pistons in the various units 3, can be controlled, firstly, so that all units 3 will function simultaneously and to the same extent in the hydraulic circuit as already described; secondly, so that the units 3 at the front of the vehicle, will act together simultaneously and to the same extent while each unit 3 at the rear of the vehicle acts independently; thirdly, so that the units 3 at the rear of the vehicle will act together and to the same extent while the units 3 at the front of the vehicle each act independently; fourthly, so that each unit 3 will act independently of the other units; and fifthly, so that units 3 at the front of the vehicle will act together simultaneously and to the same extent, while the units 3 at the rear of the vehicle will do likewise, but independently of the front units 3.

The valve illustrated in Figures 9 to 12, comprises for example, a plug cock, the plug 25 of which contains straight through ports 26 capable of being made to bridge the front and the rear portions of the pipe lines 20, 21 (Figure 9) whereby the full circuit is utilised and all the units 3 act simultaneously and to the same extent.

The plug 25 also contains in its periphery, recesses 27, 27a and opposite recess 27 ports 28 open at both ends through the periphery of the plug, while opposite recess 27a ports 29 open at both ends through the periphery of the plug 25.

By turning the plug 25 so that the ports 29 bridge the portions of the pipe lines 20, 21, connected only with the units 3 at the front of the vehicle, as illustrated in Figure 10, said units 3 are interconnected so that the pistons 5 therein move together, in the same direction and to the same extent, while at the same time the recess 27a bridges only the rear portions of the pipe lines 20, 21, and permits the pistons 5 of the rear units 3 to function independently of each other and also independently of the front units 3.

If the plug 25 be moved to the position indicated in Figure 11, with the ports 28 bridging only the rear portions of the pipe lines 20, 21, and the recess 27 bridging only the front portions of said pipe lines 20, 21, it will be found that the rear units 3 are connected to each other so that the pistons 5 therein act together in the same direction, and to the same extent, while the pistons 5 of the front units 3 are permitted to act independently of each other and also independently of the rear units 3.

The recesses 27, 27a are made large enough to permit one of the recesses to bridge the front portions of the pipe lines 20, 21, while the other of said recesses bridges the rear portions of the pipe lines 20, 21, thereby enabling each unit 3 to function independently of any other unit or units.

By duplicating the ports 28, 29, as at 28a, 29a, and placing said ports 28a, 29a at diametrically opposite points in the plug 25, the latter can be turned to a position wherein the front portions of the pipes 20, 21 will be bridged to permit synchronisation of the units 3 at the front of the vehicle, while the rear portions of the pipes 20, 21, will at the same time be bridged to permit synchronisation of the units 3 at the rear of the vehicle, synchronisation of the front units 3 however, being independent of the synchronisation of the rear units 3.

The control valve just described, is adapted for operation from the driver's seat of the vehicle, or from any other suitable point as may be required.

The resilient cushions 23 used in the cylinders 12, 12a and chamber 25a, are independent of one another, and comprise balls of rubber or the like, preferably inflated with air or gas to a predetermined pressure, the pressures in the different balls also preferably being varied or graduated throughout the cushions 23, the number of which and the pressures employed being determined by the shock to be absorbed or neutralized or the load to be borne, each resilient cushion 23 being surrounded by a non-compressible liquid.

In connection with the spring mounting system provided by the opposed cylinder 12a and associated parts, there can be provided an auxiliary cylinder 30 in communication with the chamber or cylinder 25a, connected with all of the load carrying cylinders 12a, said auxiliary cylinder 30, containing a plunger 31 adjustable by means of a screw 32, so that fluid may be forced into or drawn from the cylinders 12a to increase or decrease the pressure on the resilient cushions 23, thereby providing means for enabling the springing system to be regulated to support or resist loads of varying weights or forces.

A pressure gauge 33, calibrated to suit requirements, and connected with the hydraulic springing system, may be mounted in view of the driver of the vehicle or elsewhere, to serve as a load-o-meter for indicating the weight of the load being carried.

A control valve or valves 34a (Figure 1), can be provided in the hydraulic circuit or circuits of the stabilising system, to enable the action of the hydraulic medium employed to be regulated as required.

What I do claim and desire to obtain by Letters Patent of the United States of America is:

1. Shock absorbing and load equalizing apparatus comprising, a vehicle frame, two front wheels and two rear wheels for supporting opposite sides of the frame, a pair of oppositely arranged cylinders mounted on the frame adjacent each wheel, a second pair of oppositely arranged cylinders mounted substantially parallel to each of the first pairs of cylinders, a plurality of lever arms each actuated by relative movement of one wheel with respect to the frame, a piston mounted for reciprocation in each cylinder, separate means connecting each lever arm with all of the pistons of the cylinders adjacent each wheel for moving the respective pistons in response to relative movement between the associated wheel and the frame, a pipe connecting one cylinder of the first mentioned pair adjacent the left rear wheel with a cylinder of the first mentioned pair adjacent the right front wheel, a pipe connecting the other piston of the first mentioned pair adjacent the left rear wheel with the cylinder of the first mentioned pair adjacent the left front wheel, a pipe connecting one cylinder of the first mentioned pair adjacent the right rear wheel with the other cylinder of the first mentioned pair adjacent the right front wheel, a pipe connecting the other cylinder of the first mentioned pair adjacent the right rear wheel with the other cylinder of the first mentioned pair adjacent the left front wheel, a hydraulic medium filling said pipes and the first mentioned cylinders, one cylinder of the second mentioned pairs each having resilient means therein, conduit means connecting all of the remaining cylinders of the second mentioned pairs, and a fluid supply filling the second mentioned pairs of cylinders and the conduit means.

2. Shock absorbing and load equalizing apparatus according to claim 1 wherein a tank is interposed in the conduit means and connected to all of the last mentioned cylinders, and resilient means within said tank.

3. Shock absorbing and load equalizing apparatus according to claim 1 wherein a tank is interposed in the conduit means connected to all of the last mentioned cylinders, resilient means within said tank, and means associated with said tank for varying the pressure applied to said resilient means.

JOHN WILLIAM MORGAN.